US009438844B2

United States Patent
Camer et al.

(10) Patent No.: US 9,438,844 B2
(45) Date of Patent: Sep. 6, 2016

(54) VIDEO MULTIVIEWER SYSTEM USING DIRECT MEMORY ACCESS (DMA) REGISTERS AND BLOCK RAM

(75) Inventors: Cristian Camer, York (CA); Marcin Komorowski, Toronto (CA)

(73) Assignee: Imagine Communications Corp., Frisco, TX (US)

( * ) Notice: Subject to any disclaimer, the term of this patent is extended or adjusted under 35 U.S.C. 154(b) by 125 days.

(21) Appl. No.: 12/099,380

(22) Filed: Apr. 8, 2008

(65) Prior Publication Data

US 2009/0254683 A1 Oct. 8, 2009

(51) Int. Cl.

| G06F 13/28 | (2006.01) |
| H04N 5/445 | (2011.01) |
| G09G 5/00 | (2006.01) |
| G09G 5/14 | (2006.01) |
| G09G 5/36 | (2006.01) |
| G09G 5/397 | (2006.01) |
| H04N 21/426 | (2011.01) |
| H04N 21/431 | (2011.01) |
| H04N 21/4402 | (2011.01) |

(52) U.S. Cl.
CPC .......... *H04N 5/44591* (2013.01); *G09G 5/001* (2013.01); *G09G 5/006* (2013.01); *G09G 5/14* (2013.01); *G09G 5/363* (2013.01); *G09G 5/397* (2013.01); *H04N 5/44504* (2013.01); *H04N 21/426* (2013.01); *H04N 21/42653* (2013.01); *H04N 21/4316* (2013.01); *H04N 21/440263* (2013.01); *G09G 2340/0407* (2013.01); *G09G 2352/00* (2013.01); *G09G 2360/126* (2013.01); *G09G 2370/10* (2013.01)

(58) Field of Classification Search
None
See application file for complete search history.

(56) References Cited

U.S. PATENT DOCUMENTS

| 5,099,331 | A | * | 3/1992 | Truong .......................... 348/564 |
| 5,386,532 | A | * | 1/1995 | Sodos ............................. 710/22 |
| 5,420,984 | A | | 5/1995 | Good et al. .................... 395/275 |
| 5,848,264 | A | * | 12/1998 | Baird et al. ..................... 703/28 |
| 5,933,855 | A | * | 8/1999 | Rubinstein .................... 711/200 |
| 5,978,866 | A | * | 11/1999 | Nain ............................. 710/22 |
| 6,961,478 | B2 | * | 11/2005 | Inoue ............................ 382/284 |
| 7,023,488 | B2 | | 4/2006 | Szybiak et al. ............... 348/484 |
| 7,536,669 | B1 | * | 5/2009 | Anderson ....................... 716/16 |
| 2003/0222892 | A1 | | 12/2003 | Diamond et al. ............. 345/647 |
| 2004/0233230 | A1 | | 11/2004 | Hancock ....................... 345/690 |
| 2005/0114560 | A1 | * | 5/2005 | Coleman et al. ............... 710/22 |
| 2006/0290708 | A1 | | 12/2006 | MacInnis et al. ............ 345/592 |
| 2007/0268317 | A1 | | 11/2007 | Banay ........................... 345/660 |

(Continued)

OTHER PUBLICATIONS

Harris Corporation Unvails Breakthrough Broadcase Multiviewer—CENTRIO, Apr. 15, 2007, Harris.*

(Continued)

*Primary Examiner* — Ilwoo Park
(74) *Attorney, Agent, or Firm* — Tarolli, Sundheim, Covell & Tummino LLP

(57) ABSTRACT

A video multiviewer system includes a Graphics Processing Unit (GPU) that includes a GPU memory. A video input module is operative with the GPU for receiving video data and transferring the video data to the GPU memory via a Direct Memory Access (DMA). A programmable circuit such as a Field Programmable Gate Array (FPGA) includes a multi-ported and in one aspect a dual ported block Random Access Memory (RAM) configured for a plurality of DMA channels for receiving video data and allowing uninterrupted operation of consecutive DMA transfers of video data to the GPU memory. A display displays the multiple video windows based upon video data received within the GPU memory.

18 Claims, 8 Drawing Sheets

(56) References Cited

U.S. PATENT DOCUMENTS

2011/0280307 A1* 11/2011 MacInnis .................. G06T 9/00
375/240.15

OTHER PUBLICATIONS

Harris introduces CENTRIO multiviewer for C3ISP, Nov. 20, 2007, BroadcastEngineering.*

* cited by examiner

VIDEO MULTIVIEWER SYSTEM USING DIRECT MEMORY ACCESS (DMA) REGISTERS AND BLOCK RAM

FIELD OF THE INVENTION

The present invention relates to the field of video processing systems, and more particularly, to video multiviewers and related methods.

BACKGROUND OF THE INVENTION

As broadcasters continue the transition from analog television to digital video television, the television production process is increasingly conducted in an all-digital domain, that is, from the initial camera shot to the display in the consumer's living room. This move to digital technology permits broadcasters to simultaneously broadcast multiple video streams using a single connection. Indeed, for popular live events, broadcasters typically deploy mobile broadcast units to route and manipulate, i.e., producing the numerous video streams that come from respective cameras throughout the event before being transmitted.

An approach to manipulating and monitoring the video streams is a multiviewer, which typically includes a monitor and associated processor receiving the high resolution, digital video streams. The processor scales the video stream to fit all the video streams onto a single display. Some multiviewers use a plurality of monitors, thereby permitting the viewing of even more video streams. A potential drawback to the typical multiviewer is the difficulty in rearranging the video streams on the monitor in real time. For example, a user viewing the multiviewer monitor displaying four video streams split equally over quarters of the monitor may desire to expand a first video stream and correspondingly reduce the other video streams. This operation may cause the processor to adjust scaling operations in real time based upon requests from the user. More specifically, to provide advanced features to the user, the typical multiviewer may have to include significant hardware to provide adequate processing power, thereby possibly increasing the form factor and housing size to undesirable levels.

Some exemplary multiviewer systems include the DX series from present assignee Harris Corporation. The DX series Multiviewers delivers modular configurations for 4, 8, 12 or 16 SDI or composite inputs typically using different input modules, with auto detect of NTSC, PAL or SDI formats. Composite, component, SDI and line doubled VGA outputs provide customers with a wide range of flexible display options. Front panel controls and remote control via RS-232/422 provide the user with the ability to view real-time multiple images in various pre-configured displays. Optional software allows the user configuration of displays, and multi-system control, while options also exist for in-picture audio monitoring of SDI embedded audio. Standard alarm features include loss of video sync, black picture and frozen picture detection.

Another exemplary multiviewer system is the 7767VIP4 signal monitoring module from the Evertz corporation of Burlington, Ontario, Canada. The module simultaneously accepts, auto-detects, analyzes and displays four synchronous or asynchronous HD/SD/Analog video signals. An additional fifth computer graphic input may be used for display of a dynamic background image. A similar multiviewer system is disclosed in U.S. Pat. No. 7,023,488 to Szybiak et al.

Despite the advantages of such multiviewer systems, further enhancements may be desirable in some applications. For example, system memory constraints often impose restrictions on the number of video inputs that may be simultaneously displayed. Additionally, the ability of such systems to display added graphic content (e.g., backgrounds, indicators, etc.) along with the video inputs on the display may be encumbered by the requirement for separate inputs for such content, or for performing offline modifications to video inputs or display templates, for example.

SUMMARY OF THE INVENTION

A video multiviewer system includes a Graphics Processing Unit (GPU) that includes a GPU memory. A video input module is operative with the GPU for receiving video data and transferring the video data to the GPU memory via a Direct Memory Access (DMA). A programmable circuit such as a Field Programmable Gate Array (FPGA) includes a multi-ported and in one aspect a dual ported block Random Access Memory (RAM) configured for a plurality of DMA channels for receiving video data and allowing uninterrupted operation of consecutive DMA transfers of video data to the GPU memory. A display displays the multiple video windows based upon video data received within the GPU memory.

The system includes a DMA controller. The dual ported Block RAM includes first and second ports. The first port is operative for accessing video data based on independent read/write access and the second port is operative for accessing video data based on simultaneous read/write access by the DMA controller. The system also includes a read/write controller and plurality of registers. The DMA controller operates on DMA channel "n" and is operative for pre-reading registers for DMA channel "n+1." The DMA controller can change state variables in a register set when data is transferred within DMA channel "n." The DMA controller is also operative for modifying data within registers and passing the data back to the Read/write controller to be stored back within the Block RAM.

This Block RAM is scalable as to the number of DMA channels required for passing data to the GPU memory. A video data controller is operative with the video input module for assigning addresses to be used for video data within the GPU memory.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Figure 1:
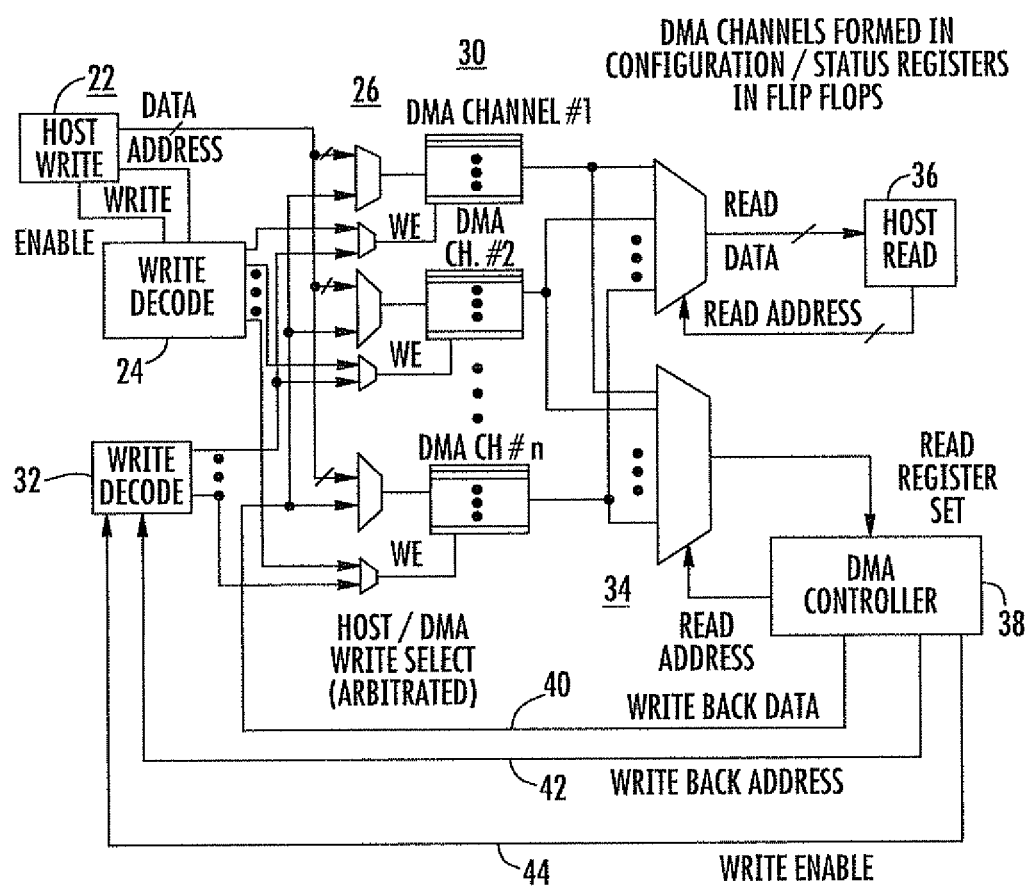
FIG. 1 is a block diagram of a prototype Field Programmable Gate Array (FPGA)/Application Specific Integrated Circuit (ASIC) implementation of configuration/state registers for a multi-channel Direct Memory Access in accordance with a non-limiting example and designed as a prototype for the multiviewer configuration shown in FIGS. 2-4.

FIG. 1 shows this prototype as a DMA configured system 20 for Direct Memory Access (DMA) configuration/state registers using a multi-channel DMA. The block diagram shows a Host Write circuit 22 connected to a Write Decode circuit 24 and a number of Host/DMA Write Select circuits 26 that are arbitrated into a number of DMA channels formed in configuration/status registers in flip flops 30 and illustrated as DMA channel 1, DMA channel 2 and continuing to DMA channel "n." A second Write Decode circuit 32 is illustrated and receives Write Enable signals and Write Back Address signals from the DMA controller. These DMA channels 30 are formed as configuration/status registers in flip flops of a Field Programmable Gate Array circuit. The configuration/status registers in flip flops 30 output to various logic circuits 34 and output read data to a Host Read circuit 36 and the DMA controller 38 as illustrated. The DMA controller 38 feeds back Write Back data, Write Back address and Write Enable signals to the Write Decode circuit 32 and arbitrated write select circuit 26 along a respective Write Back data line 40, Write Back address line 42, and Write Enable line 44 as illustrated.

Figure 2:
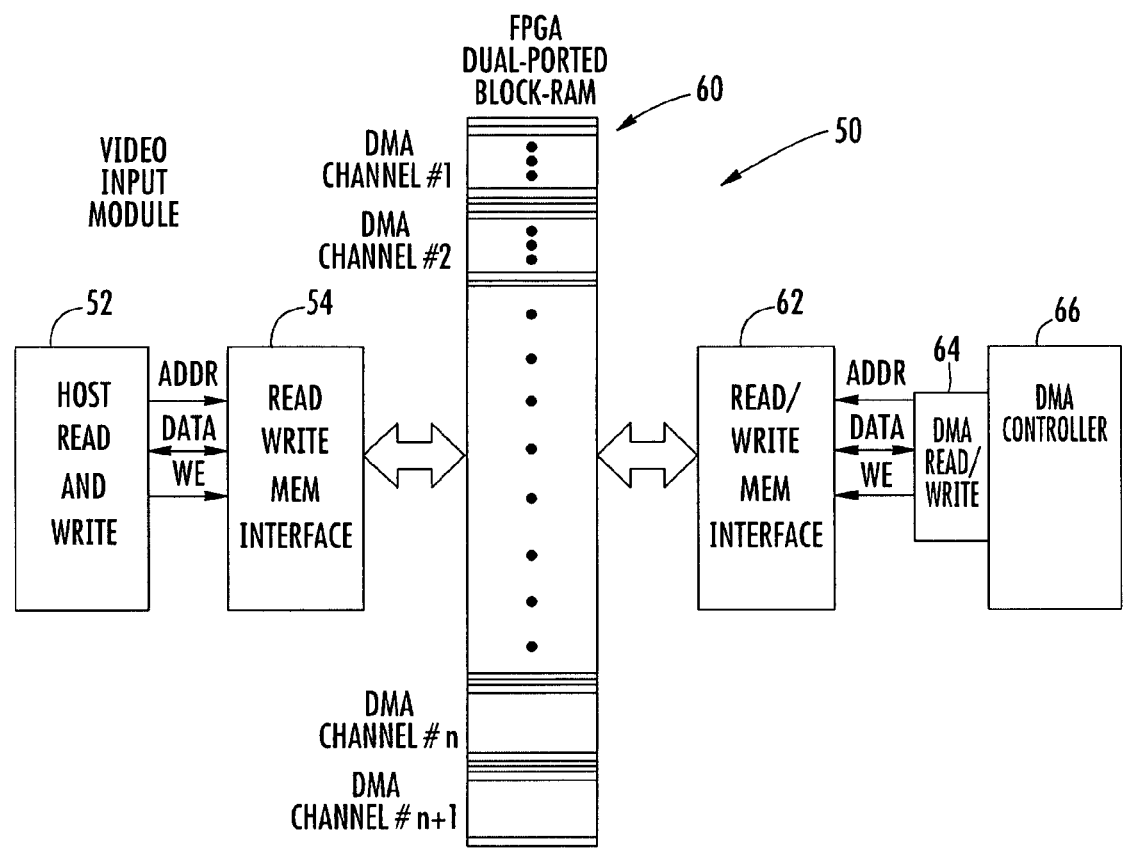
FIG. 2 is a block diagram showing Direct Memory Access (DMA) registers in Block Random Access Memory (RAM) of a Field Programmable Gate Array (FPGA) in accordance with a non-limiting example of the present invention.
Figure 3:
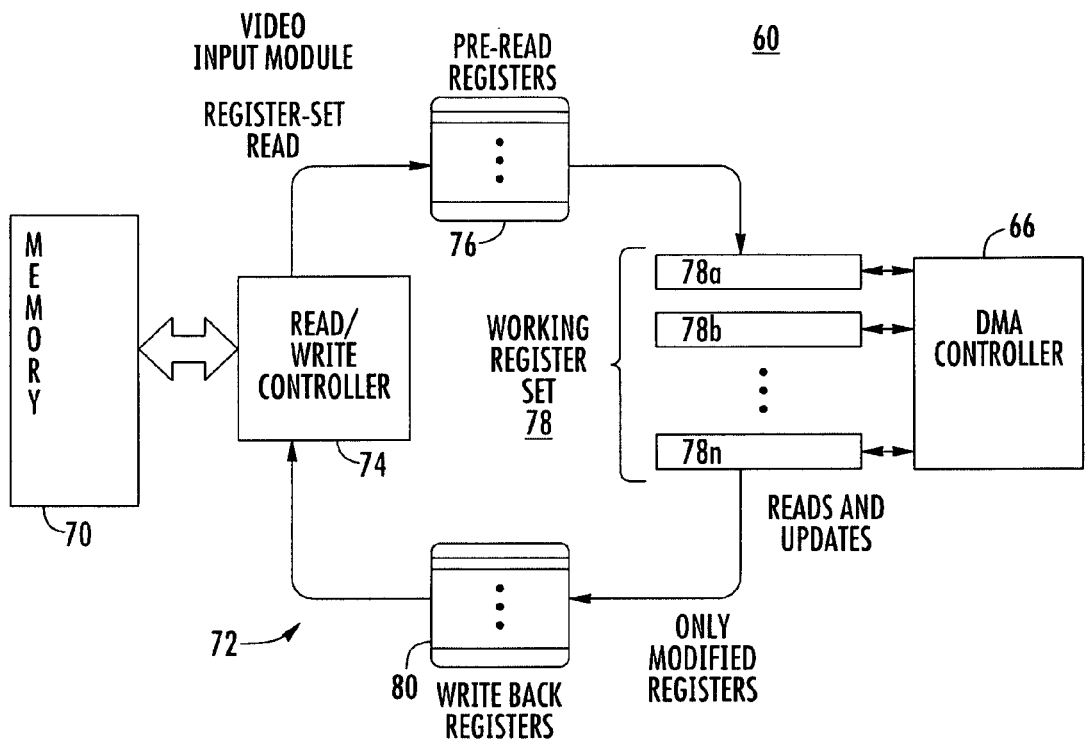
FIG. 3 is a block diagram showing the DMA registers in Block RAM for a register read/write logic function in accordance with a non-limiting example of the present invention.
Figure 4:
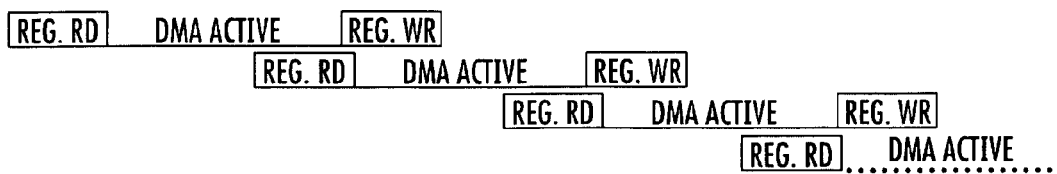
FIG. 4 is a timing pipeline for a single read/write Block RAM port to allow uninterrupted operation of consecutive DMA transfers in accordance with a non-limiting example of the present invention.

FIG. 1 shows a prototype multiviewer configuration that was developed initially and used to develop the multiviewer shown in FIGS. 2-4. This prototype multiviewer includes a video input module that in an early prototype supported eight DMA channels. These prototype configuration/state registers were implemented fully in Field Programmable Gate Array (FPGA) flip flops and associated circuit logic. Different performance requirements, however, necessitated over 20 DMA channels. Future performance requirements necessitated scaling this larger number of DMA channels to over 1,000 DMA channels supported in a single Field Programmable Gate Array. Field Programmable Gate Arrays, however, typically do not incorporate and support sufficient logic and flip flops to support such a vast number of DMA channel configuration/state registers, where such large logic would run slow for practical implementations. It was therefore desirable to enhance this prototype configuration design and achieve an uninterrupted DMA flow through a larger number of DMA channels, such as over a thousand or more DMA channels.

In this prototype configuration shown in FIG. 1, all configuration and state/status registers are stored in the FPGA flip flops, which is inefficient for storing large amounts of data. Additionally, any Write arbitration and decode logic and Read logic circuit are implemented in FPGA logic blocks. This results in an implementation that requires many flip flops and many resources, including FPGA logic resources. In addition, this prototype circuit is not adequately scaleable and slows down with increased size. In this prototype configuration, attempts to support many DMA channels result in a DMA configuration/state maintenance using many FPGA resources, which limits the speeds supported by the DMA.

In accordance with a non-limiting example of the present invention, most of this excess logic using FPGA flip flops is replaced using a multi-ported and in one aspect a dual ported Block RAM. As is known, RAM implementations typically permit access to a limited number of bits at a time, making Block RAM typically not applicable to general register files. In case of an application where only a subset of registers needs to be used at a time, such as with multi-channel DMA applications, it becomes possible to build a highly scalable solution using an FPGA Block RAM. It should be understood that different programmable circuits besides FPGA's can be used, including different types of ASIC's and other processors using Block RAM.

A high-level diagram of a DMA configured Block RAM system 50 as part of a video input module of a video multiviewer system having DMA registers in Block RAM is shown in FIG. 2. The dual-ported nature of FPGA Block RAM allows independent read/write access by a Host such as a video controller or read/write controller for configuration through one port, and simultaneous read/write access by the DMA engine (controller or processor) via a second port. This eliminates a requirement for access arbitration logic. Any read/write decode and control logic is also already built into the Block RAM, thus eliminating a requirement for implementing it in FPGA logic as in the prototype DMA circuit shown in FIG. 1.

An uninterrupted DMA video or other data for a video multiviewer is achieved through a large number of DMA channels while using Block RAM, which effectively has only a single read/write port. FIG. 2 shows the high-level block diagram in which the Host Read and Write circuit 52 is operable with a Read/Write Memory Interface 54 and each communicates with the other through appropriate Address (ADDR) lines, Data lines and Write Enable (WE) lines. The Read/Write Memory Interface 54 communicates with the Field Programmable Gate Array (FPGA) dual-ported Block RAM 60 through a first port. The Block RAM 60 has a plurality of different DMA channels as illustrated, up to "n" and "n+1" DMA channels, which could be configured for as many as several thousand DMA channels. The dual-ported Block RAM 60 is operable with another Read/Write Memory Interface 62 through the other port and thus to the DMA read/write circuit 64 and DMA controller (engine or processor), which collectively can be referred to as the DMA engine. The DMA Read/Write circuit 64 communicates using appropriate Address, Data and Write Enable signal lines with the Read/Write Memory Interface 62.

FIG. 3 shows the DMA registers in Block RAM 60 with Memory 70 and the register read/write logic circuit illustrated generally at 72. The Memory 70 interfaces with the Read/Write controller 74 that is operable with the Pre-Read registers 76 and Working registers as a register 78, formed as a plurality of working registers 78*a*, 78*b* . . . 78*n* that are operable with Reads and Updates to the DMA controller 66. This Working Register Set 78 is operable with Write Back Registers 80 that are operable with the read/write controller 74 forming a loop circuit as illustrated. The Working Register Set 78 sends signals concerning only the modified registers with Reads and Updates for the video data to the DMA engine (or controller) 66.

The DMA register access logic is generally shown in this block diagram of FIG. 3. For efficient Read-Write Back data access a pipelined approach is utilized, such that the Working Register Set 78 required for the next DMA channel "n" data transfer is Pre-Read ahead of time (note the Pre-Read Registers 76), and passed onto the DMA controller 60 when required. While the DMA controller operates on DMA channel "n," the read/write Controller 74 pre-reads registers for DMA channel "n+1." The DMA controller 66 changes state variables in the Working Register Set 78 as it performs the data transfer of channel "n." The data transfer is accomplished and the DMA controller (engine) 66 moves onto the next DMA channel (i.e., "n+1") and the modified data in registers are passed back to the Read/Write Controller 74 to be stored back into the Block RAM 60. At this point, the system has its Write-Back logic "holding" registers 80 for DMA channel "n," the DMA controller 66 operating on DMA channel "n+1" registers, and the Pre-Read logic fetching registers for the next DAM channel "n+2."

FIG. 4 shows timing of this pipeline, and demonstrates how a single read/write Block RAM port is sufficient to allow uninterrupted operation of consecutive DMA transfers. The logic required to implement this pipeline is significantly smaller than any arbitration/decode logic circuit required in a larger multi-channel DMA utilizing flip flops for configuration/state storage.

This FPGA Block RAM solution as described allows for scalability that is only limited by the size of available Block RAM memory in the FPGA. It can easily be scaled up to thousands of DMA channels without noticeable impact on speed and requires typically only additional storage space in Block RAM. A sample implementation can support 2,000 DMA channels, while utilizing a relatively small portion of the FPGA.

The flexible DMA configuration using FPGA Block RAM as described is operable with the Graphic Processing Units (GPU) used in video multiviewer systems in which DMA signals are sent to texture memory or other Graphics Processing Units. These frames of video data are typically split into many blocks and sent as separate blocks over separate DMA channels into different memory locations for a video multiviewer system that has extensive scaling in one non-limiting embodiment. Different Field Programmable Gate Arrays could be used for this system, including FPGA's manufactured by Xilinx and Altera that use dual port Block RAMs. Thus, the system dual ports a Read/Write Memory Interface 54 and interacts with the DMA controller 66 through a Read/Write Memory Interface 62 as shown in FIG. 2.

Although a number of DMA channels could be implemented using the prototype configuration registers and flip flops such as described relative to FIG. 1, the Block RAM approach as described in the improvement over the prototype in accordance with a non-limiting example of the present invention is advantageous. The additional logic that is required to select and control which register the system writes into is now part of the Block RAM, as well as the logic for reading, thus allowing greater amounts of Block RAM with many DMA channels. The Read/Write Decode function is built into the Block RAM. Because a hard DMA circuit is used, only a fraction of the registers need be accessed at a time, for example, in one non-limiting example, about a fifth of the registers. The system can have access to one of the registers out of an entire set of registers at one time. The system can go through fewer clock cycles to read the registers out for the next DMA transfer and the system can take the registers from the previous DMA transfer and write them back into the memory to store them.

From a design point of view, when using a minimum number of DMA channels, it is easier to implement a circuit for such minimum number of DMA channels in regular flip flops for speed and efficiency. When greater than 20 and 50 DMA channels are required, however, and expansion is necessary, the use of regular flip flops is not advantageous. When a large amount of video data for a multiviewer must be brought into the system, the greater number of DMA channels are required as described in accordance with a non-limiting example of the present invention. This system also allows greater ability to scale.

For example, a DMA burst could be a block of 512 bytes for one DMA channel. The Read/write Controller 74 reads a corresponding configuration in the registers and processes data for the Pre-Read Registers 76 and passes data onto the DMA controller 66, which operates on the registers such as on regular flip flops in function. Thus, the system increments the last written address and how much data has been sent across. When it returns, the system knows it has written the 512 bytes and is done sending those 512 bytes. It passes the resulting and updated information to any registers as status registers and back to the Write Back Registers 80. For example, if there is a list of a number of different DMA data bursts coming through during the first DMA, the Read/Write Controller 74 can pre-fetch the configuration information from the next DMA and the DMA controller 66 does not have to wait for the configuration for the second DMA burst to be read out since it is read out already and now ready to be used. Once the DMA controller 66 has processed the second DMA burst, the configuration in the status registers for the first DMA burst is in the Write Back registers 80 and written back into the memory by the Read/Write Controller 74. Thus, the system can achieve an uninterrupted DMA data flow through a large number of DMA channels while using effectively only a single read/write port as described.

It should be understood that it is possible to use the system as described further with different video multiviewer systems as described below.

Figure 5:
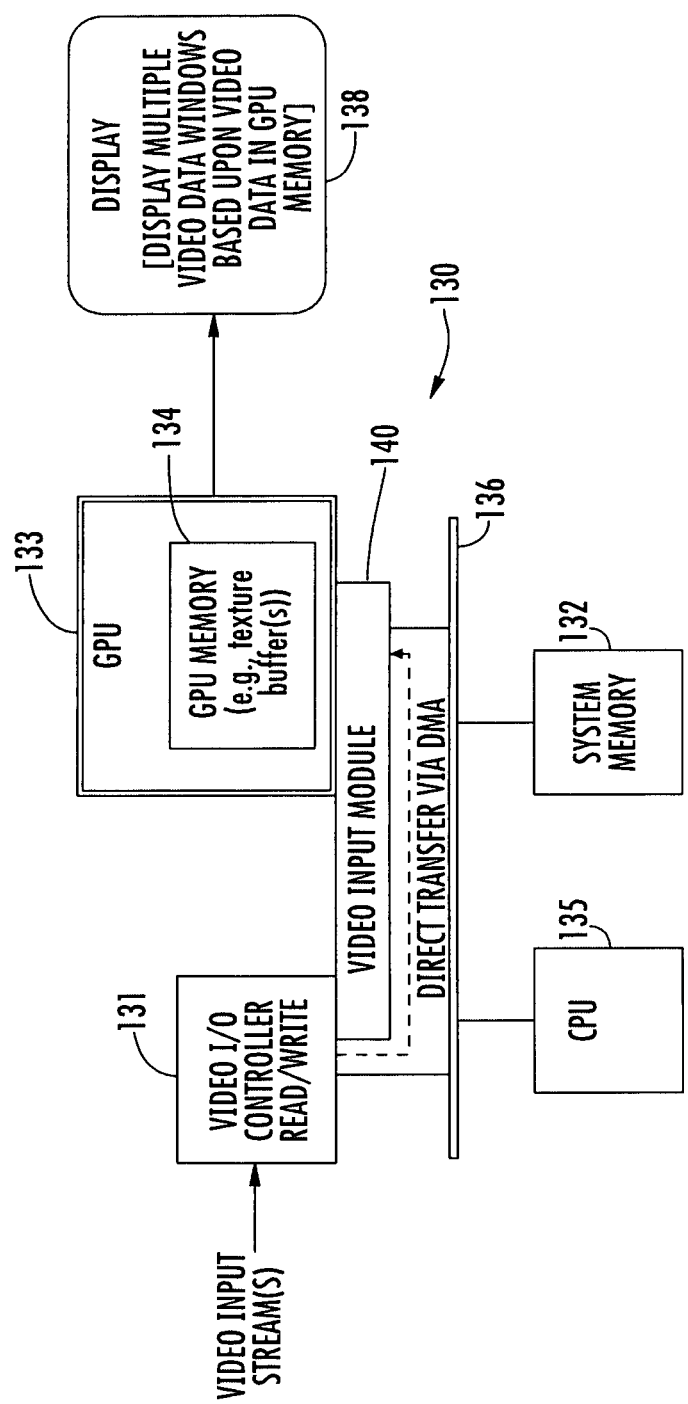
FIG. 5 is a schematic block diagram of a video multiviewer system that provides a direct video data transfer to a GPU memory that could be modified to use the Block RAM DMA configuration in accordance with a non-limiting example of the present invention.

As shown in FIG. 5, a video multiviewer system 130 overcomes the drawbacks of transferring video streams to the graphics memory of a display that typically requires the use of an intermediate system memory buffer to manage the transfer between a hardware device and the display. It overcomes the disadvantages of consuming host CPU resources, memory resources, and bus bandwidth, thus overcoming a significant limit on the number of video streams than can be simultaneously displayed.

One technology that is currently used for video rendering is Microsoft DirectShow, part of the DirectX family of API applications. DirectShow allows the transfer of video streams to video memory, but it requires CPU resources to manage the transfers. Typical prior art techniques use an input/output (I/O) controller to copy video stream data to system memory from the hardware device. The CPU copies the video stream data to the display device. This requires two separate DMA transfer operations. For relatively high bandwidth video streams, this may pose a significant limiting factor in a video system's capabilities, since DMA bandwidth has a fixed limit.

As mentioned above, the system 130 illustratively includes a video I/O controller 131, a system memory 132, and a Graphics Processing Unit (GPU) 133 including a GPU memory 134 in which video data is input using a video input module that includes the flexible DMA configuration and FPGA Block RAM as described before. By way of example, the GPU memory 134 may include one or more texture buffers, which may be associated with respective video input streams or feeds, as will be appreciated by those skilled in the art. The system 130 also illustratively includes a central processing unit (CPU) 135. In the illustrated example, access between the video I/O controller 131, GPU 133, CPU 135, and system memory 132 is provided via a system bus 136, as will also be appreciated by those skilled in the art. The GPU is operable with a display 138. The video input module 140 receives data along the bus 136 and can be individual input modules that are used to DMA data into the GPU. PCI Express can be used as one non-limiting implementation.

The video I/O controller 131 assigns addresses to be used for video data in the GPU memory 133 (i.e., texture buffers). By way of comparison, using the DirectShow application discussed above, in a typical prior art arrangement the texture buffers would temporarily be locked while textures are loaded from the video I/O controller to the texture buffers via the system memory 132. Drawing or rendering operations would not be permitted during such locked periods. Yet, the constant locking and unlocking of the texture buffers requires additional overhead, and therefore delays memory transfers. Moreover, this can also result in a video I/O controller changing destination addresses in the GPU memory 134, which may result in a still further overhead penalty if the video I/O controller 131 has to be reset or re-programmed to desired texture buffer addresses.

The CPU 135 advantageously operates the video I/O controller 131 to transfer video data to the GPU memory 134 via direct memory access (DMA) without using the system memory 132. Accordingly, the system may advantageously increase the amount of video data transferred to the GPU 133 within a given amount of time, and thereby allow more video inputs to be displayed on the display than would otherwise be possible if the same video had to be routed through the system memory.

The CPU may cooperate with the I/O controller 131 to lock the assigned addresses. By way of example, the GPU memory 133 may include at least one texture buffer 134 in which the CPU locks the assigned addresses. Furthermore, the video I/O controller may receive a plurality of video input streams, and the at least one texture buffer may include a respective texture buffer for each video input stream. Moreover, the CPU may operate the video I/O controller 131 and the GPU 133 to transfer video data in real time. Also, the video multiviewer system may further include at least one data communications bus coupled to the video I/O controller 131, the system memory 132, the GPU 133 and the CPU 135.

By way of example, the video data may include video frame data. Furthermore, the CPU may use at least one Microsoft DirectX application programming interface (API) for operating the video I/O controller 131 and the GPU 133, for example. By locking the texture buffer of the Direct3D texture, the physical memory can address to allow the hardware I/O controller 131 to DMA transfer video stream data from the hardware device directly to the texture buffer. This technique does not require an intermediate host memory buffer for the video stream data thus saving this memory for other uses.

This technique can rely on the fact that the GPU device driver does not change the physical memory address of the texture buffer and it remains available for the duration of the transfer. The system exploits an undocumented and unsupported behavior of the GPU device driver and the Microsoft DirectX run time. This allows a Centrio™ multiviewer as described above to make more efficient use of the hardware platform, thus providing more functionality with less hardware than competitive products. Since video frames are passed via DMA transfer once instead of twice, it effectively doubles the number of video streams the system could transfer otherwise.

Further examples of a video multiviewer system that is adapted for enhanced scaling and can be modified for use with the flexible DMA configuration using the FPGA Block RAM described relative to FIGS. 2-4 is set forth below.

Figure 6:
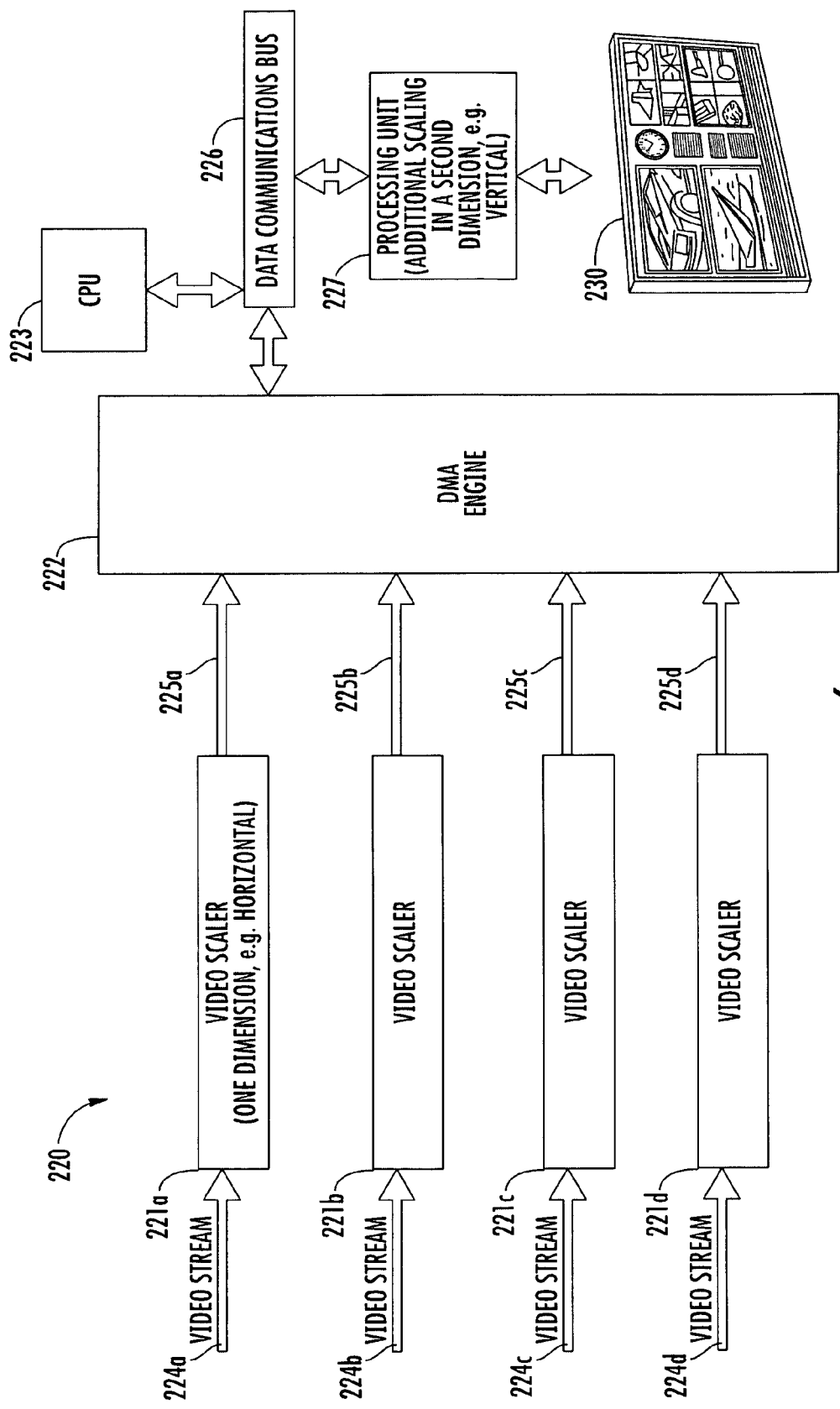
FIG. 6 is a schematic block diagram of a video multiviewer system that can be modified to use the Block RAM DMA configuration in accordance with a non-limiting example of the present invention.

Referring initially to FIG. 6, a video multiviewer system 220 illustratively includes a plurality of video scalers 221a-221d operating in parallel for generating initially scaled video streams 225a-225d by performing video scaling in at least one dimension on a plurality of video input streams 224a-224d. Each video input stream 224a-242d may comprise a Society of Motion Picture and Television Engineers (SMPTE) 424M 3G-Serial Digital Interface (SDI) standard, for example. Moreover, although illustrated as receiving 4 video input streams 224a-225d, the video multiviewer system 220 may alternatively receive less or more video input streams.

The multiviewer system 220 illustratively includes a processing unit 227 coupled downstream from the video scalers 221a-221d for generating additionally scaled video streams (video output streams) by performing additional video scaling on the initially scaled video streams 225a-225d, and a display 230 cooperating with the processing unit for displaying multiple video windows based upon the additionally scaled video streams. Although illustrated as a single screen display, the display 230 may comprise a plurality of screens, for example, 94 displays. Advantageously, the video multiviewer system 220 may scale the video input streams 224a-224d more efficiently by distributing the computationally intensive process of scaling the video input streams.

More particularly, each of the video scalers 221a-221d illustratively performs video scaling in only one dimension, for example, in a horizontal dimension of video frames. The processing unit 227 illustratively performs video scaling in a vertical dimension of video frames to complete the scaling of the video input streams 224a-224d. Advantageously, the computationally intensive vertical scaling, which may use large amounts of storage and logic resources, may be performed by the processing unit 227. As will be appreciated by those skilled in the art, other distributions of the scaling processes may be implemented. In general, less intensive scaling processes should be allocated to the video scalers 221a-221d while the more complex scaling processes should be allocated to the processing unit 227.

Additionally, each of the video scalers 221a-221d may comprise a hardware implemented video scaler. In other words, the processing power of the video scalers 221a-221d may be limited and static. Advantageously, the video multiviewer system 220 allocates the horizontal scaling processes, which use fewer resources than the vertical scaling processes, to the video scalers 221a-221d. Moreover, each of the video scalers 221a-221d may perform video scaling as a selectable power of 2, for example, 1, 2, 4, 8, and so forth, further reducing computational intensity demands on the video scalers. Advantageously, since the computational demand on the hardware implemented video scalers 221a-221d is limited, the size of the packaging and housing used for the video scalers is reduced. For example, a single field-programmable gate array (FPGA) may be used to implement the video scalers 221a-221d to prescale 8 3G-SDI video input streams.

The video scalers 221a-221d and the processing unit 227 illustratively cooperate to process data other than video stream data using distributed processing, for example, metadata extraction and audio ballistics metering. More specifically, the video scalers 221a-221d may also perform bit data extraction, thereby advantageously reducing bandwidth passed on to the processing unit 227. The processing unit 227 may perform data decoding and interpretation based upon the bit data extraction. Furthermore, to reduce the computational payload of a Central Processing Unit (CPU) 223 for audio processing, the video scalers 221a-221d may calculate raw ballistics values while the processing unit 227 cooperates to interpret the data and render appropriate audio amplitudes and phase meters.

The processing unit 227 is preferably formed as a Graphics Processing Unit (GPU) including a GPU processor and GPU memory coupled thereto as noted relative to FIG. 5. Moreso with the dedicated GPU memory, the processing unit 227 may efficiently handle the computationally and memory intensive vertical scaling tasks.

The video multiviewer system 220 illustratively includes a Direct Memory Access (DMA) engine 222 coupled between the video scalers 221a-221d and the processing unit (GPU) 227. Also, a second FPGA, in addition to the FPGA that may implement the video scalers 221a-221d, may be used to implement the DMA engine 222.

The video multiviewer system 220 illustratively includes a data communications bus 226 coupled between the DMA engine 222 and the processing unit (GPU) 227, and the CPU 223 coupled to the data communications bus. Advantageously, after the video input streams 224a-224d are prescaled, the DMA engine 222 "DMAs" the initially scaled video streams 225a-225d into the processing unit 227 for final scaling.

As will be appreciated by those skilled in the art, the data communications bus 226 has an associated bandwidth and corresponding data throughput that may limit processing for scaling in the processing unit 227. Advantageously, in the video multiviewer system 220, since the scaling is distributed between the video scalers 221a-221d and the processing unit 227, the bandwidth bottleneck of the data communication bus 226 is less likely to be exceeded. Indeed, the distributed scaling of the video multiviewer system 220 may allow for sufficiently offloading the processing unit 227 so that it handles the remaining scaling work, and the distributed scaling sufficiently reduces the DMA engine 222 bandwidth to "DMA" up to 64 video streams over modern local bus architectures, such as, PCI Express (1st generation) and Hyper Transport.

Advantageously, since the video multiviewer system 220 consumes limited physical space, the system may be installed into a Platinum multiviewer, as available from the Harris Corporation of Melbourne, Florida (Harris Corp.), the assignee of the present application, or a router. Additionally, the video multiviewer system 220 may control routing of the video input streams 224a-224d. More specifically, the video multiviewer system 220 may access any of the router inputs, for example, that is all 512 inputs in a 28RU Platinum router, as available from the Harris Corp.

Although illustrated with a single plurality of video scalers 221a-221d and a corresponding processing unit 227, data communications bus 226, CPU 223, and DMA engine 222 (all together hereinafter referenced as a "set"), in other embodiments, the video multiviewer system 220 may additionally include multiple sets, all of which may be installed in the 28RU Platinum router, for example.

The video multiviewer system 220 may selectively choose which set a video input stream routes to. Thereby, the video multiviewer system 220 may actively balance internal resource utilization between sets, and thus makes it possible to get better performance out of the same hardware.

Moreover, if a user of the video multiviewer system 220 chooses to display the same video input streams 224a-224d in two picture-in-pictures (PIPs) of different size, the video multiviewer system can route it to two of its inputs, and apply different pre-scaling ratios to yield the best quality picture for both PIPs.

Advantageously, the number of video input streams 224a-224d received by the video multiviewer system 220 is scalable. In particular, the number of inputs may be scalable based on the scalability of the 28RU Platinum Router. Additionally, the number of outputs can be scaled up by inserting additional "sets" into the Platinum router frame, and each set may work independently of each other while having no limiting effect on other sets in the frame.

Since all sets in a frame have access to the same inputs, a user may readily build a video multiviewer system 220 that spans a single video frame across two or more displays 230 driven by two or more sets, each set routing the same video stream to its input and displaying the corresponding portion of the video frame. This may allow for spanning a single video frame across a wall of displays.

Figure 7:
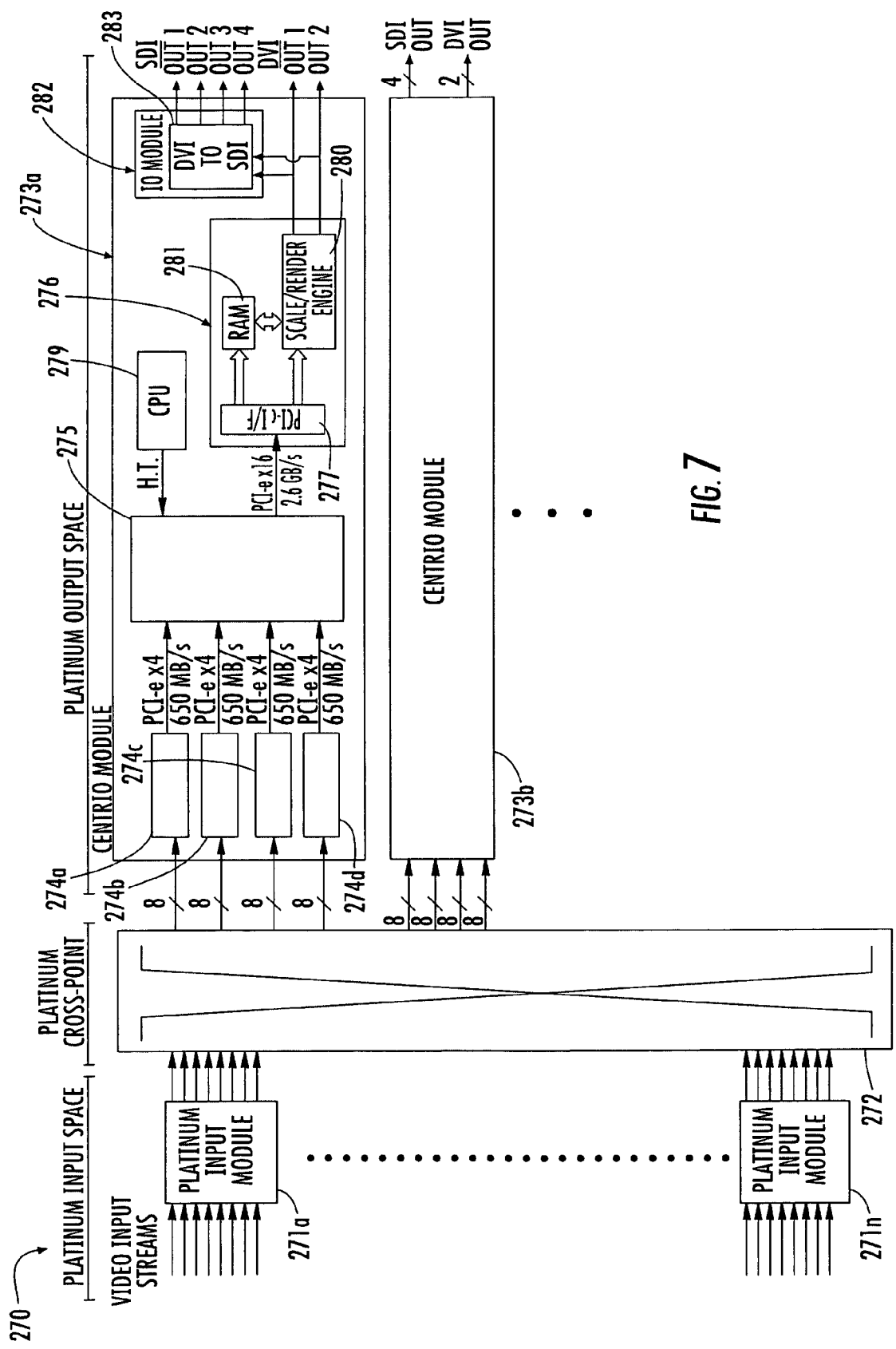
FIG. 7 is a more detailed schematic block diagram of a video multiviewer system that can be modified to use the Block RAM DMA configuration in accordance with a non-limiting example of the present invention.

Referring to FIG. 7, as will be appreciated by those skilled in the art, an exemplary implementation of a video multiviewer system 270, similar to the multiviewer 220 as shown in FIG. 1, is now described. The video multiviewer system 270 illustratively includes a plurality of Platinum Input Modules (PIMs) 271a-271n, as will be available from the Harris Corp. Each PIM 271a-271n illustratively receives eight video input streams. The video multiviewer system 270 may include up to 64 PIMs, receiving a total of 512 video input streams. The output of the PIMs 271a-271n is fed into a Platinum cross-point switcher 272, as will be available from the Harris Corp. The Platinum cross-point switcher 272 is fed into a plurality of Centrio modules 273a-273b, as will be available from the Harris Corp. Although illustrated with 2 Centrio modules 273a-273b, the video multiviewer system 270 may further include a total of 16 Centrio modules.

Each Centrio module 273a-272b illustratively includes a plurality of video input modules 274a-274d feeding into a local data bus 275 cooperating with a CPU 279, and a GPU 276. The local data bus 275 may comprise, for example, a PCI Express (1st generation) data bus or a Hyper Transport data bus. The GPU 276 illustratively includes a data bus 277, a Random Access Memory module 281 cooperating with the data bus, and a scaler/rendering engine 280 cooperating with the data bus. The GPU 276 outputs to the input-output module 282 including a Digital Visual Interface (DVI) to SDI converter 283.

Figure 8:
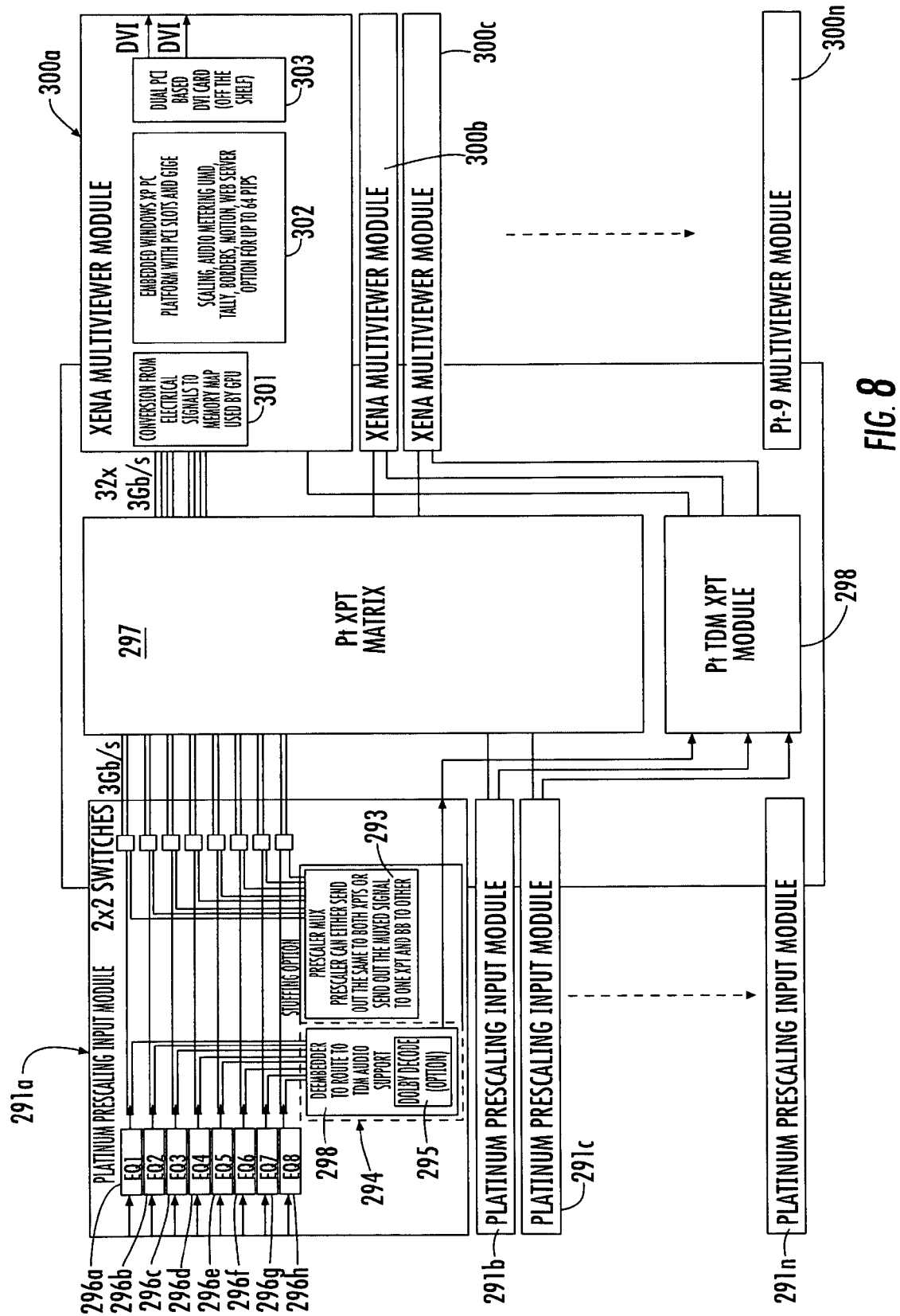
FIG. 8 is a more detailed schematic block diagram of yet another video multiviewer system that can be modified to use the Block RAM DMA configuration in accordance with a non-limiting example of the present invention.

The video multiviewer system 290 shown in FIG. 8 illustratively includes a plurality of Platinum Prescaling Input Modules (PPIMs) 291a-291n, as will be available from the Harris Corp. Each PPIM 291a-291n illustratively receives eight video input streams.

Each PPIM 291a-291n illustratively includes respective equalizers 296a-296h for each video input stream, and a prescaler module 294 including a deembedder 298 cooperating with a prescaler multiplexer 293. The deembedder 298 also includes an optional Dolby decoder 295. The outputs of the PPIMs 291a-291n are illustratively received by the Platinum cross-point matrix 297 and a Platinum TDM cross-point module 298, both as will be available from the Harris Corp. The outputs of the Platinum cross-point matrix 297 and the Platinum TDM cross-point module 298 are received by a plurality of multiviewer modules 300a-300n. Each multiviewer module 300a-300n illustratively includes a converter 301, a scaler module 302 receiving the output of the converter, and a DVI card (GPU) 303 receiving the output of the scaler module.

The communication link between the PPIMs 291a-291n and the multiviewer modules 300a-300n may have a payload bandwidth divided into 8 equal parts, each allocated to one of the 8 video input streams (channels) on a given PPIM. After reserving space for a given channel's pre-processed ancillary space and audio ballistics information, the remaining bandwidth may be allocated for the video stream. The video pre-scaling ratio may be hardcoded on a per-video standard basis, and stored in a table for hardware automatic lookup. The pre-scaling ratio may be selected to result in the highest bandwidth that fits in the allocated payload bandwidth.

The pre-processing parameters may be hardcoded at design or system integration phase and may not be dynamically changed. The packet size in the communications link may match the packet size used by multiviewer modules 300a-300n local bus and DMA engine, thus minimizing logic required to handle the pre-processed data.

Advantageously, the communications links in the video multiviewer system 290 follow the same profile. Any communication link may be used by the multiviewer modules 300a-300n without these modules interfering with each others operation. A single communication link may carry all 8 channels from a given input module, i.e., a multiviewer module 300a-300n may have full simultaneous access to up to 32 PPIMs 291a-291n, permitting greater access.

Figure 9:
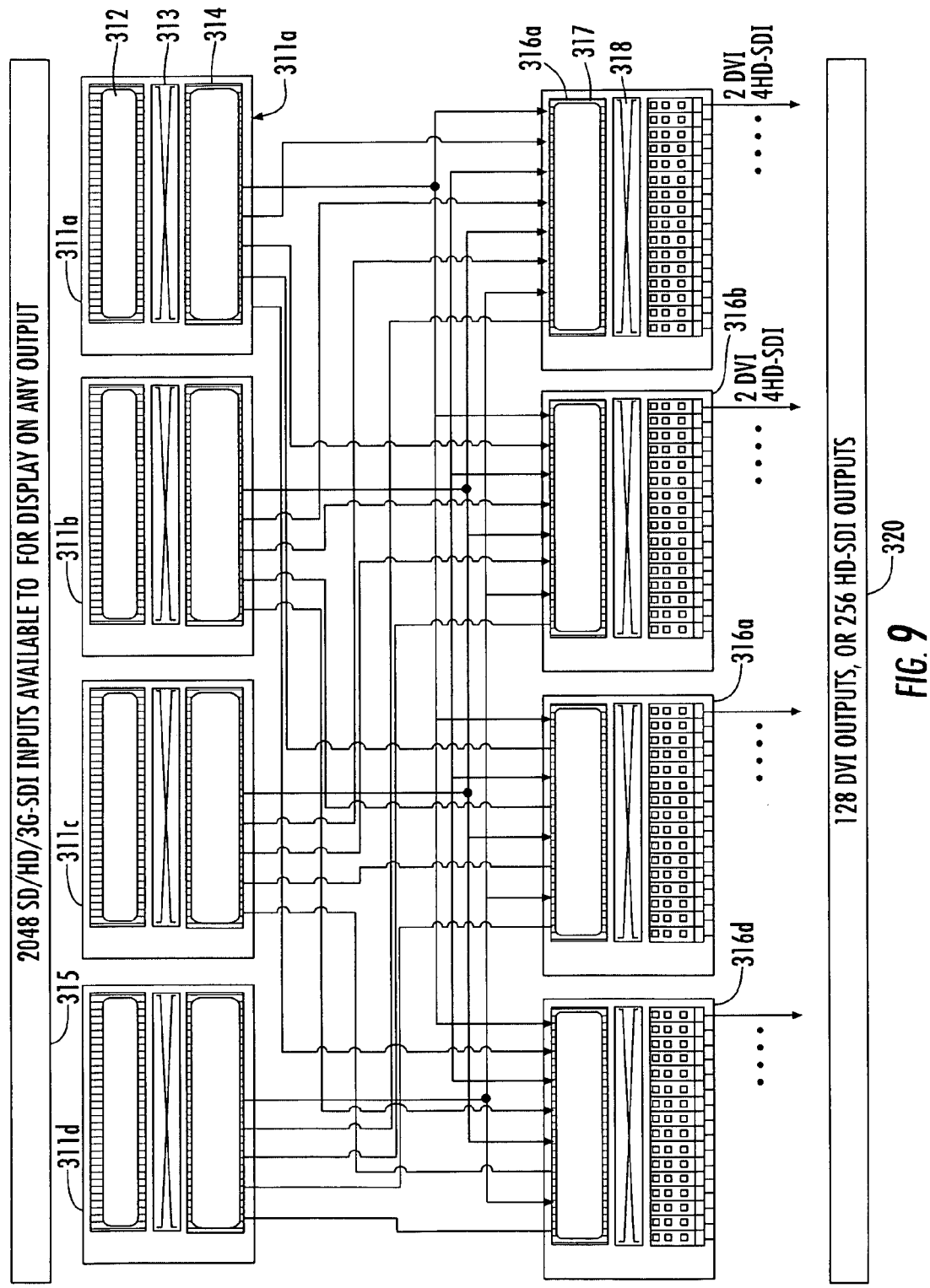
FIG. 9 is yet another more detailed schematic block diagram of a video multiviewer system that can be modified to use the Block RAM DMA configuration in accordance with a non-limiting example of the present invention.

Referring now to FIG. 9, as will be appreciated by those skilled in the art, another exemplary implementation of the video multiviewer system 220 (FIG. 1), is now described. This video multiviewer system 310 illustratively includes a plurality of first 28RU Platinum router frames 311a-311d, as will be available from the Harris Corp, each including a plurality of inputs 312, a cross-point switcher 313 coupled thereto, and a plurality of outputs 314 upstream of the cross-point switcher.

The outputs 314 are received by a plurality of second 28RU Platinum router frames 316a-136d, each also including a plurality of inputs 317, a cross-point switcher 318 coupled thereto, and a plurality of outputs 319 upstream of the cross-point switcher. The video multiviewer system 310 illustratively receives 2048 SD/GD/3G-SDI video input streams and outputs 128 DVI outputs, or alternatively 256 HD-SDI outputs. As will be appreciated by those skilled in the art, the video multiviewer system 310 may be scaled to have more or less inputs and outputs.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A video multiviewer system comprising:
a graphics processing unit (GPU) comprising a GPU memory;
a Direct Memory Access (DMA) controller;
a video input module configured to receive simultaneously a plurality of video streams corresponding to video data and transfer the video data to the GPU memory via DMA, wherein the video input module comprises a programmable circuit having dual-ported Block Random Access Memory (RAM) comprising first and second ports, wherein the first port is operative with a host and the second port is operative with the DMA controller, wherein the dual-ported Block RAM is configured with a plurality of DMA channels for receiving the video data based on a number of plurality of video streams received at the video input module and is further configured to allow uninterrupted operation of consecutive DMA transfers of the video data to the GPU memory, wherein the first port is configured to allow independent read/write access by the host for configuration of the plurality of DMA channels using the first port, and the second port is configured to access video data in the plurality of DMA channels using simultaneous read/write access by DMA controller through the second port; and
a display configured to receive the video data stored at the GPU memory and simultaneously present multiple video streams in respective windows of the display.

2. The video multiviewer system according to claim 1, and further comprising a Read/Write controller and plurality of registers, wherein as the DMA controller operates on DMA channel "n," the Read/Write controller is operative for pre-reading registers for DMA channel "n+1".

3. The video multiviewer system according to claim 2, wherein the DMA controller changes state variables in registers when the video data is transferred within DMA channel "n".

4. The video multiviewer system according to claim 2, wherein the DMA controller is operative for modifying the video data within registers and passing the video data back to the Read/Write controller to be stored back within the dual-ported Block RAM.

5. The video multiviewer system according to claim 1, and further comprising a video data controller operative with the video input module for assigning addresses to be used for the video data within the GPU memory.

6. The video multiviewer system according to claim 1, and further comprising a plurality of video scalers operating in parallel for generating initially scaled video data by performing video scaling in at least one dimension on the plurality of video streams.

7. A video multiviewer system comprising:
a graphics processing unit (GPU) comprising a GPU memory;
a Direct Memory Access (DMA) controller;
a Read/Write controller;
a video input module configured to receive simultaneously a plurality of video streams corresponding to video data and transfer the video data to the GPU memory via DMA, wherein the video input module comprises a Field Programmable Gate Array (FPGA) comprising a dual ported Block Random Access Memory (RAM) comprising Pre-read registers, Write Back registers and Working registers, and further comprising first and second ports, wherein the dual-ported Block RAM is configured with a plurality of DMA channels for receiving the video data based on a number of plurality of video streams received at the video input module, wherein the first port is operative with a host and the second port is operative with the DMA controller, wherein the DMA controller and the Read/Write controller are operative together with the Pre-read registers, Write Back registers and Working registers for receiving the video data and allowing uninterrupted operation of consecutive DMA transfers of the video data to the GPU memory, wherein the first port is configured to allow independent read/write access by the host for configuration of the plurality of DMA channels through the first port, and the second port is configured to access the video data of the plurality of DMA channels using simultaneous read/write access by the DMA controller through the second port; and
a display configured to receive the video data stored at the GPU memory and simultaneously present video streams in respective windows of the display.

8. The video multiviewer system according to claim 7, wherein as the DMA controller operates on DMA channel "n," the Read/Write controller is operative for pre-reading registers for DMA channel "n+1.

9. The video multiviewer system according to claim 7, wherein the DMA controller changes state variables in registers when the video data is transferred within DMA channel "n".

10. The video multiviewer system according to claim 7, wherein the DMA controller is operative for modifying the video data and passing the video data back to the Read/Write controller to be stored back the dual-ported Block RAM.

11. The video multiviewer system according to claim 7, and further comprising a video data controller operative with the video input module for assigning addresses to be used for the video data within the GPU memory.

12. The video multiviewer system according to claim 7, and further comprising a plurality of video scalers operating in parallel for generating initially scaled video data by performing video scaling in at least one dimension on the plurality of video streams.

13. A method for displaying multiple video windows on a video multiviewer display, comprising:
receiving, at a video input module, simultaneously a plurality of video streams corresponding to video data, wherein the video input module is coupled to a Graphics Processing Unit (GPU) having a GPU memory and further coupled to a DMA controller;
transferring the video data to the GPU memory via DMA through a programmable circuit having a dual ported Block Random Access Memory (RAM) comprising first and second ports, wherein the first port is operative with a host and the second port is operative with the DMA controller, wherein the dual-ported Block RAM is configured with a plurality of DMA channels for receiving the video data based on a number of plurality of video streams received at the video input module and is further configured to allow uninterrupted operation of consecutive DMA transfers of the video data to the GPU memory, wherein the first port is configured to allow independent read/write access by the host for configuration of the plurality of DMA channels through the first port, and the second port is configured to access video data in the plurality of DMA channels using simultaneous read/write access by the DMA controller through the second port;
receiving, at a display, the video data stored at the GPU memory; and
presenting simultaneously video streams in respective windows.

14. The method according to claim 13, which further comprises operating on DMA channel "n" with the DMA controller while the Read/Write controller pre-reads registers for DMA channel "n+1".

15. The method according to claim 13, which further comprises changing state variables in registers while transferring the video data within DMA channel "n".

16. The method according to claim 13, which further comprises modifying the video data within registers and passing the video data back to the Read/Write controller to be stored back within the dual-ported Block RAM.

17. The method according to claim 13, which further comprises assigning addresses for the video data within the GPU memory.

18. The method according to claim 13, which further comprises scaling the video data within a plurality of video scalers operating in parallel and generating initially scaled video data by performing video scaling in at least one dimension on the plurality of video streams.

* * * * *